United States Patent [19]
Katsura

[11] Patent Number: 5,918,082
[45] Date of Patent: Jun. 29, 1999

[54] SPROCKET WHEEL AND LENS-FITTED PHOTO FILM UNIT WITH THE SAME

[75] Inventor: Hirofumi Katsura, Kanagawa, Japan

[73] Assignee: Fuji Photo Film Co., Ltd., Kanagawa, Japan

[21] Appl. No.: 08/917,471

[22] Filed: Aug. 26, 1997

[30] Foreign Application Priority Data

Aug. 28, 1996 [JP] Japan ...................................... 8-226663

[51] Int. Cl.⁶ .............................. G03B 1/00; G03B 17/42
[52] U.S. Cl. .......................... 396/395; 396/397; 396/401; 396/411
[58] Field of Search ..................................... 393/395, 396, 393/397, 399, 400, 401, 411, 415

[56] References Cited

U.S. PATENT DOCUMENTS

| | | | |
|---|---|---|---|
| 5,476,232 | 12/1995 | Kataoka et al. ...................... | 242/348.4 |
| 5,581,316 | 12/1996 | Kamoda et al. ........................ | 396/401 |
| 5,585,877 | 12/1996 | Huang et al. ........................... | 396/399 |
| 5,617,164 | 4/1997 | Siekierski et al. ..................... | 396/401 |
| 5,634,161 | 5/1997 | Huang et al. ........................... | 396/398 |
| 5,749,009 | 5/1998 | Naka et al. ............................. | 396/395 |
| 5,790,900 | 8/1998 | Katsura et al. ......................... | 396/6 |
| 5,875,366 | 2/1999 | Yoshida et al. ........................ | 396/395 |

*Primary Examiner*—Eddie C. Lee
*Attorney, Agent, or Firm*—Young & Thompson

[57] ABSTRACT

A sprocket wheel is used with photo film which includes a plurality of perforation groups arranged in a longitudinal direction thereof and cyclically at a pitch predetermined for one frame. Each of the perforation groups includes first and second perforations arranged at a predetermined distance. The sprocket wheel is rotated by a predetermined amount while the photo film is wound per one frame. The sprocket wheel includes a wheel portion. Four teeth are arranged on a periphery of the wheel portion. A first one of the teeth is meshed with the first perforation. Then a second one of the teeth is meshed with the second perforation. The first and second teeth split the periphery of the wheel portion into first and second arc-shaped faces. The first arc-shaped face is determined in association with the predetermined distance. The second arc-shaped face has a radius greater than a radius of the first arc-shaped face, to push the photo film. The wheel portion, after the second tooth is moved away from the second perforation, is rotated by the photo film with friction between the second arc-shaped face and the photo film.

32 Claims, 12 Drawing Sheets

F I G. 1
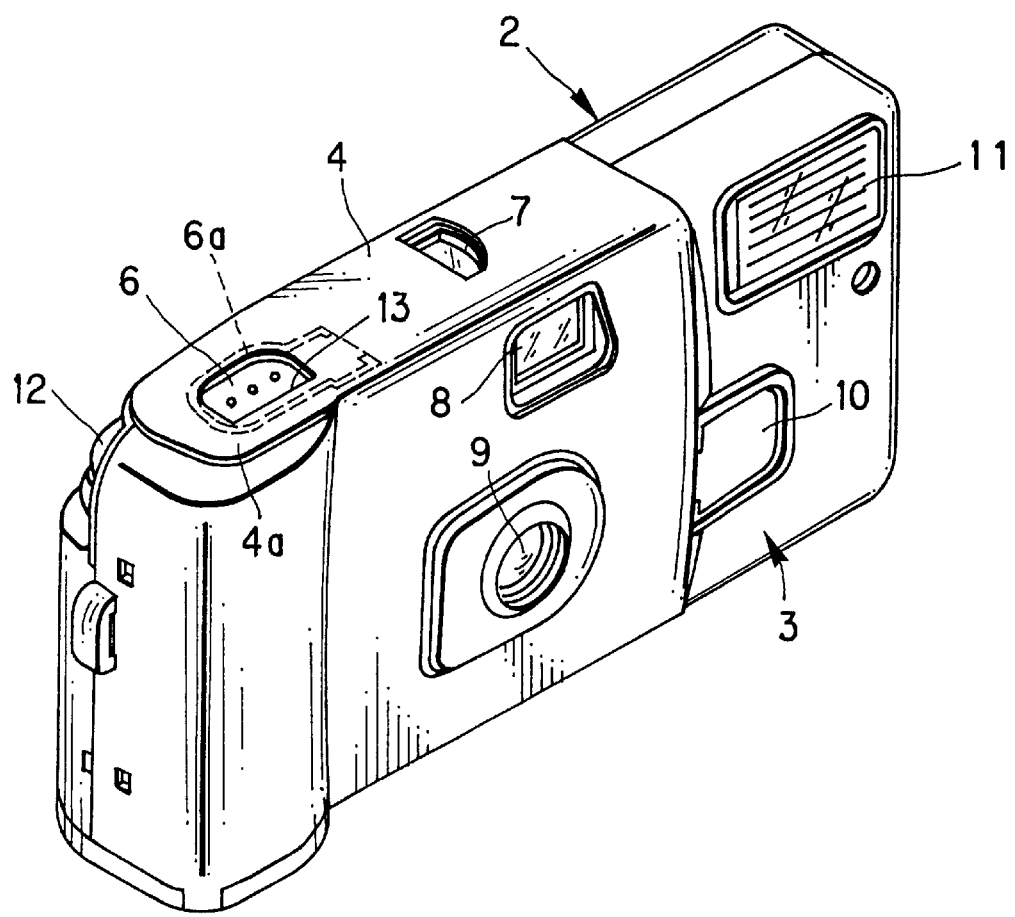

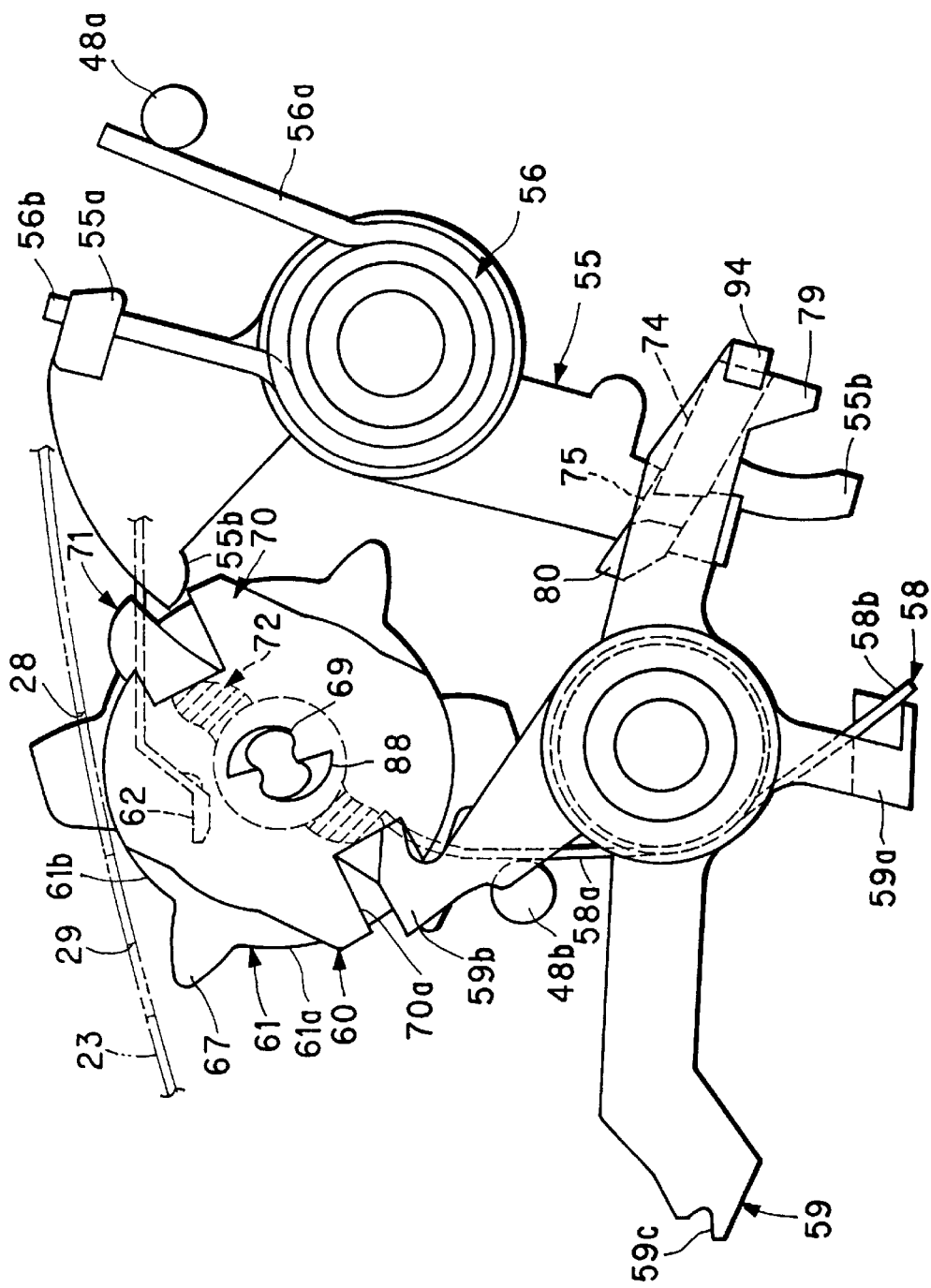

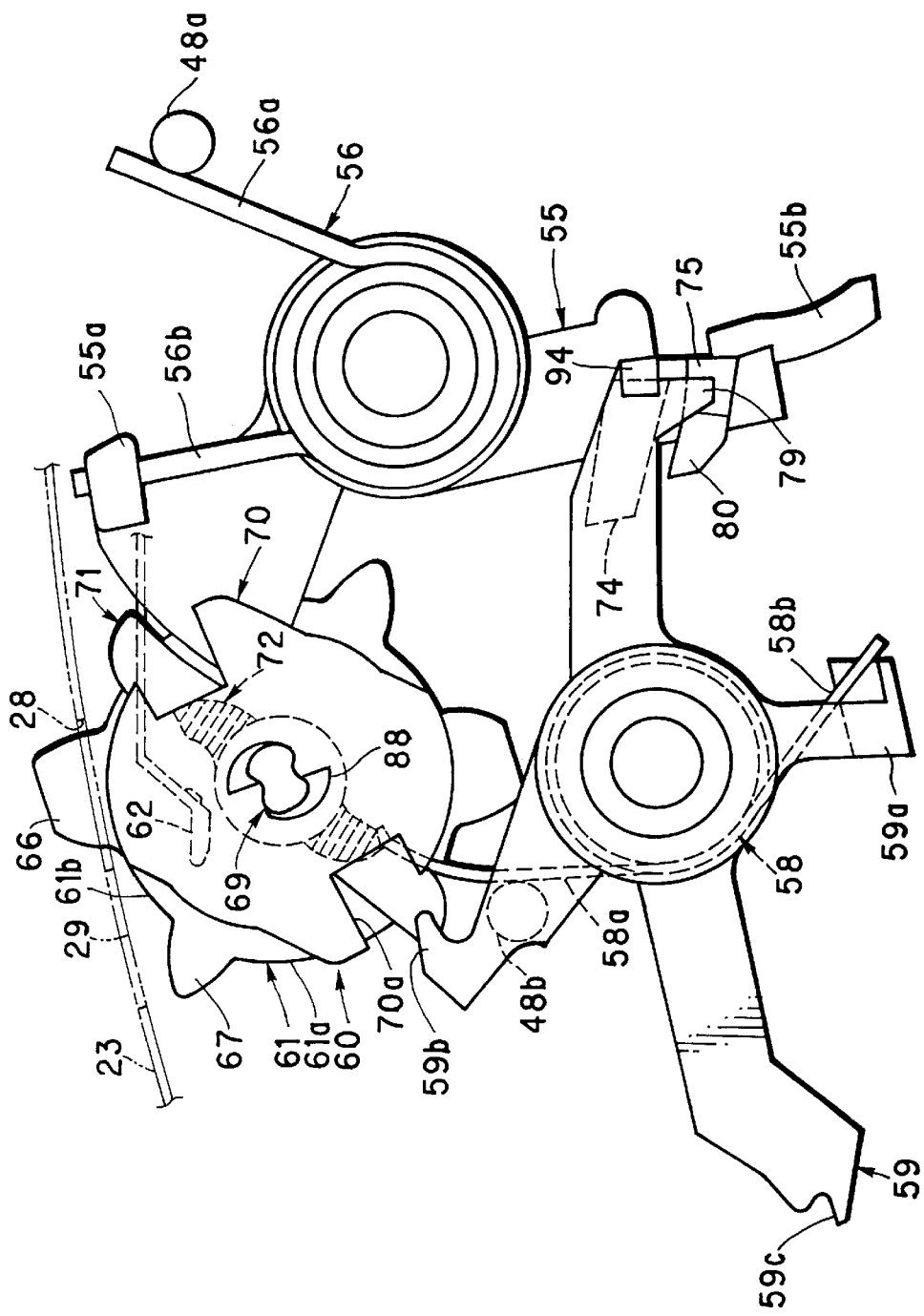

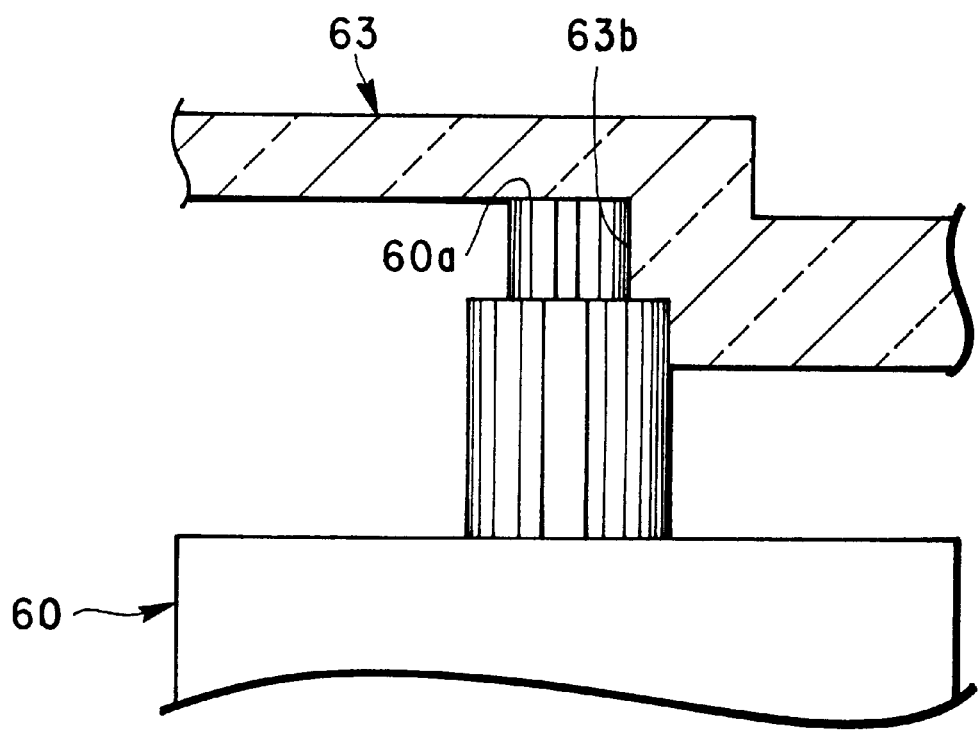

SPROCKET WHEEL AND LENS-FITTED PHOTO FILM UNIT WITH THE SAME

BACKGROUND OF THE INVENTION

1. Field of the Invention

The present invention relates to a sprocket wheel and a lens-fitted photo film unit with the same. More particularly, the present invention relates to a sprocket wheel for use with photo film which has two perforations per one frame, and a lens-fitted photo film unit with the same sprocket wheel.

2. Description Related to the Prior Art

A photo film of the IX240 type according to the "Advanced Photo System (trademark)" is known. This type of photo film is contained in a resinous cassette different from a photo film cassette of the 135 type, and has two perforations per frame. Compact cameras or lens-fitted photo film units, such as Fujicolor Quicksnap Super Slim (trade name, manufactured by Fuji Photo Film Co., Ltd.), are widely sold as products in which the photo film of this type is contained.

A photo film winding device is incorporated in the lens-fitted photo film unit. The photo film winding device includes a sprocket wheel, in which two pairs of teeth are disposed thereabout. Among the teeth, one pair of teeth is positioned in a rotationally symmetrical manner from another pair of teeth. In the photo film, the perforations are regular but intermittent. There occurs a situation where a relatively long section between two of the teeth is confronted with the photo film, and the teeth are not meshed with any of the perforations. In view of this, the photo film winding device includes a spring of a plate shape. A cam member is secured coaxially with the sprocket wheel, and is biased rotationally by the spring, so that the spring rotates the sprocket wheel in a winding direction. Thus a succeeding one of the teeth of the sprocket wheel can come to a position in mesh with one of the perforations in the photo film. With the rotary cam member rotated, a shutter device is charged, and a counter wheel is rotationally set for indicating the number of remaining available frames.

In the photo film winding device, the rotary cam member is rotationally biased by the spring with great biasing force, so that the photo film winding device has a shortcoming in that a photo film winder wheel cannot be rotated lightly by manual operation. One option is conceived to reduce the biasing force of the spring. However another problem arises in that the sprocket wheel cannot be rotated to a sufficient extent. It is likely that a succeeding one of the teeth of the sprocket wheel fail to come to a suitable position contacting the photo film, and will fail to be in mesh with one of the perforations. If a user uses the lens-fitted photo film unit in an environment with much minute dust, for example on the seashore with sand on a windy day, dust is likely to enter a top opening or slit about a shutter release button, and remain between the rotary cam member and the spring, so that the sprocket wheel does not properly rotate. The photo film is not acceptably fed by one frame.

SUMMARY OF THE INVENTION

In view of the foregoing problems, an object of the present invention is to provide a sprocket wheel and a photo film winding device with which a photo film winder wheel can be rotated lightly by manual operation, and a photo film can be fed properly by one frame.

In order to achieve the above and other objects and advantages of this invention, a sprocket wheel is used with photo film, the photo film including a plurality of perforation groups arranged in a longitudinal direction thereof and cyclically at a predetermined pitch, each of the perforation groups including first and second perforations arranged at a predetermined distance, the sprocket wheel being rotated by a predetermined amount while the photo film is wound per one frame by the predetermined pitch of the perforation groups. The sprocket wheel includes a wheel portion. At least first and second teeth are arranged on a periphery of the wheel portion, the first tooth being meshed with the first perforation, and then the second tooth being meshed with the second perforation, the first and second teeth splitting the periphery of the wheel portion into first and second arc-shaped faces, the first arc-shaped face being determined in association with the predetermined distance. At least a portion of the second arc-shaped face has a radius greater than a radius of the first arc-shaped face, to push the photo film. The wheel portion, after the second tooth is moved away from the second perforation, is being rotated by the photo film with friction between the second arc-shaped face and the photo film.

In a preferred embodiment, the first and second arc-shaped faces are integrally formed with the wheel portion.

The first arc-shaped face is defined by an arc having a first radius, the second arc-shaped face is defined by an arc having a second radius, and the second radius is greater than the first radius.

At least one pair comprises first and second pairs, the second pair includes the first and second teeth, the first pair includes third and fourth teeth, the third tooth being diametrically opposite rotationally symmetrical with the first tooth, and the fourth tooth being diametrically opposite rotationally symmetrical with the second tooth. There are third and fourth arc-shaped faces defined by the third and fourth teeth on the periphery of the wheel portion, the third arc-shaped face being diametrically opposite rotationally symmetrical with the first arc-shaped face, and the fourth arc-shaped face being diametrically opposite rotationally symmetrical with the second arc-shaped face.

The second arc-shaped face is protruded in a curved manner as viewed in a cross section of the wheel portion.

Or the second arc-shaped face is substantially straight as viewed in a cross section of the wheel portion, and two edges between which a straight shape of the second arc-shaped face lies are rounded.

The second perforation is greater than the first perforation, and second tooth is greater than the first tooth.

In the present invention, the sprocket wheel is included in a photo film winding device for winding photo film. The photo film winding device includes a winder wheel and a sprocket wheel, the winder wheel being adapted to winding the photo film per one frame by the predetermined pitch of the perforation groups, the sprocket wheel being meshed with the perforations, and rotated by a predetermined amount while the photo film is wound per the one frame, a shutter device being charged in response thereto.

Furthermore, a bias mechanism rotationally biases the sprocket wheel, to prevent the sprocket wheel from rotationally braked with rigidity of the photo film while the second arc-shaped face presses the photo film.

A rotating member is rotatable in a manner integral with the sprocket wheel by the predetermined amount, for charging the shutter device. A retainer mechanism is engaged with the rotating member when the rotating member is rotated by the predetermined amount, for locking the sprocket wheel to prevent the photo film from being moved, the retainer mechanism being disengaged from the rotating member upon a release of the shutter device, to allow the sprocket wheel to rotate.

The retainer mechanism, when the second tooth is meshed with the second perforation, is engaged with the rotating member to lock the sprocket wheel.

A frame counter wheel is rotationally stepped when the rotating member rotates by the predetermined amount, to display indication related to a number of frames exposed on the photo film.

A driven projection is formed to project from the rotating member radially. The bias mechanism is disposed to extend into a rotational path of the driven projection, the driven projection being pushed by the bias mechanism to rotate upon disengagement of the second tooth of the first pair, the sprocket wheel being rotated before the third tooth of the second pair comes in mesh with the first perforation of another of the perforation groups.

In the present invention, the photo film winding device having the novel sprocket wheel is incorporated in a lens-fitted photo film unit.

BRIEF DESCRIPTION OF THE DRAWINGS

The above objects and advantages of the present invention will become more apparent from the following detailed description when read in connection with the accompanying drawings, in which:

FIG. 1 is a perspective illustrating a lens-fitted photo film unit;

FIG. 5 is a plan illustrating a state of the exposure unit when a shutter device is charged;

FIG. 6 is a plan illustrating a state of the exposure unit after the shutter device is released;

FIG. 7 is a rear elevation, partially in section, illustrating a top of a rotating member covered by a top plate;

DETAILED DESCRIPTION OF THE PREFERRED EMBODIMENTS OF THE PRESENT INVENTION

Figure 2:
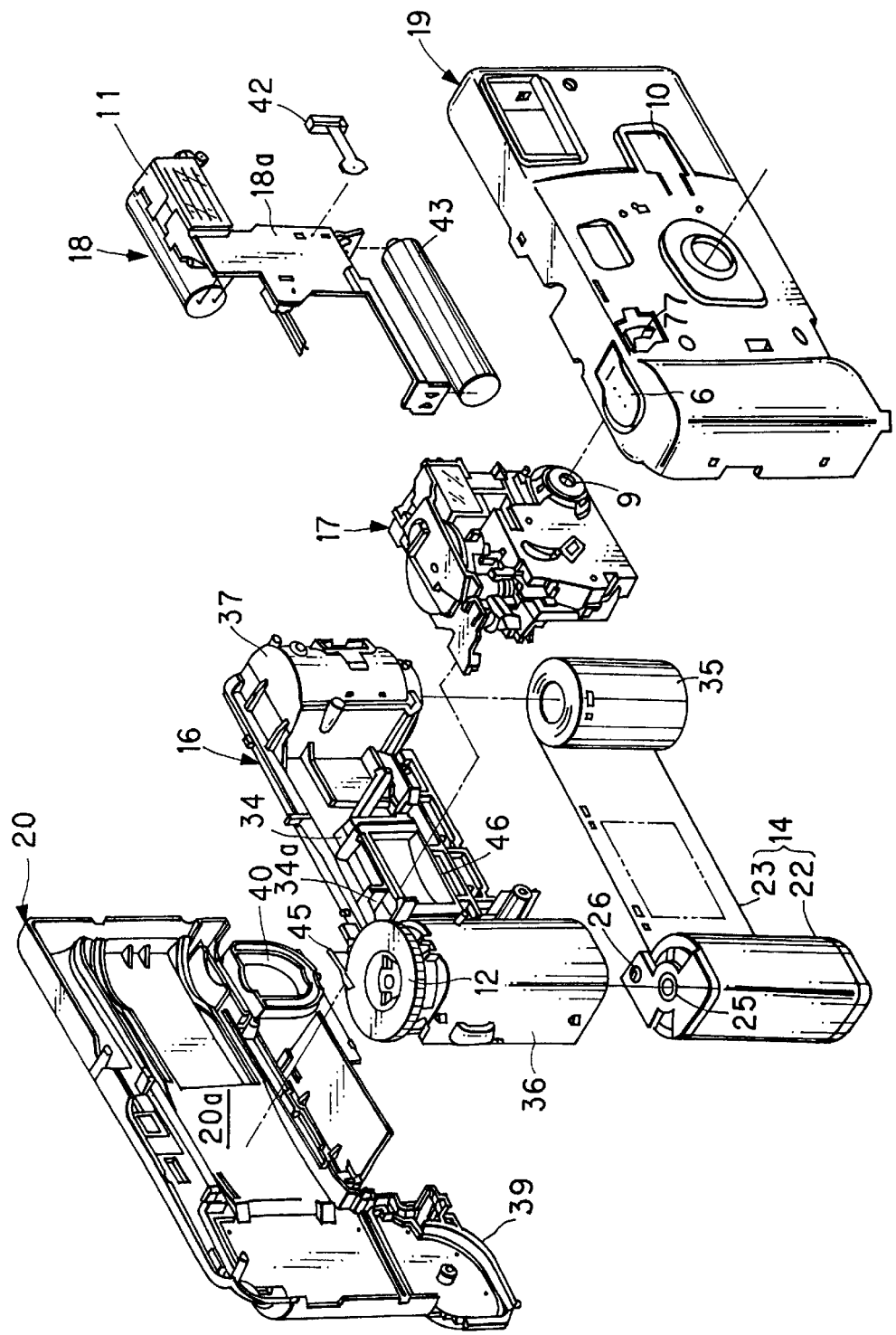
FIG. 2 is an exploded perspective illustrating the lens-fitted photo film unit.

In FIG. 1, a lens-fitted photo film unit 2 is constituted by a photo film housing 3 and an outer sheet member 4 of cardboard partially covering the housing 3. The housing 3 is pre-loaded with a photo film cassette, and includes structures for taking exposures. A top of the housing 3 has a shutter release button 6 and a counter window 7. A front of the housing 3 has a viewfinder 8, a taking lens 9, a flash charge button 10 and a flash emitting window 11. There is a photo film winder wheel 12, which appears in a rear of the housing 3 in an operable manner for rotation each time after taking an exposure.

A back surface of the outer sheet member 4 is coated with adhesive agent, to attach the outer sheet member 4 to cover the center of the housing 3 and portions about the shutter release button 6. The outer sheet member 4 has openings in which there appears the center of the shutter release button 6, the taking lens 9, the viewfinder 8, the counter window 7 and the like. There is a top opening or slit 6a defined about the shutter release button 6. A tongue 4a of the outer sheet member 4 covers the portions about the shutter release button 6, and blocks entry of dust, sand or the like into the housing 3. On the outer sheet member 4, there is no adhesive agent specially in a region near to an outer opening 13 for contact with the shutter release button 6 in order to allow safe operation of depressing the shutter release button 6.

In FIG. 2, the housing 3 is constituted by a photo film containing unit 16 or main body, an exposure unit 17, an electronic flash unit 18, a front cover 19, and a rear cover 20. The photo film containing unit 16 is loaded with a photo film cassette 14. The exposure unit 17 and the flash unit 18 are secured to the front of the photo film containing unit 16. The front cover 19 covers the front of the photo film containing unit 16. The rear cover 20 covers the rear of the photo film containing unit 16. All those are assembled and secured by use of engagement of hooks.

The photo film cassette 14 is constituted by a cassette shell 22 and a photo film 23 contained in the cassette shell 22. The cassette shell 22 is formed from resin. A spool 25 is contained in the cassette shell 22 in a rotatable manner. A trailer of the photo film 23 is retained on the spool 25. Also the cassette shell 22 incorporates a mechanism for advancing a leader of the photo film 23 externally upon rotation of the spool 25, as disclosed in U.S. Pat. No. 5,476,232 (corresponding to JP-A 6-266053). A cassette shutter rod 26 is contained in a photo film passage port (not shown) through which the photo film 23 is passed into and out of the cassette shell 22. The cassette shutter rod 26 is externally rotated to open/close the photo film passage port. When the cassette shutter rod 26 closes, the passage port is blocked from ambient light, in a manner similar to operation of light-trapping fabric called plush.

Figure 3:
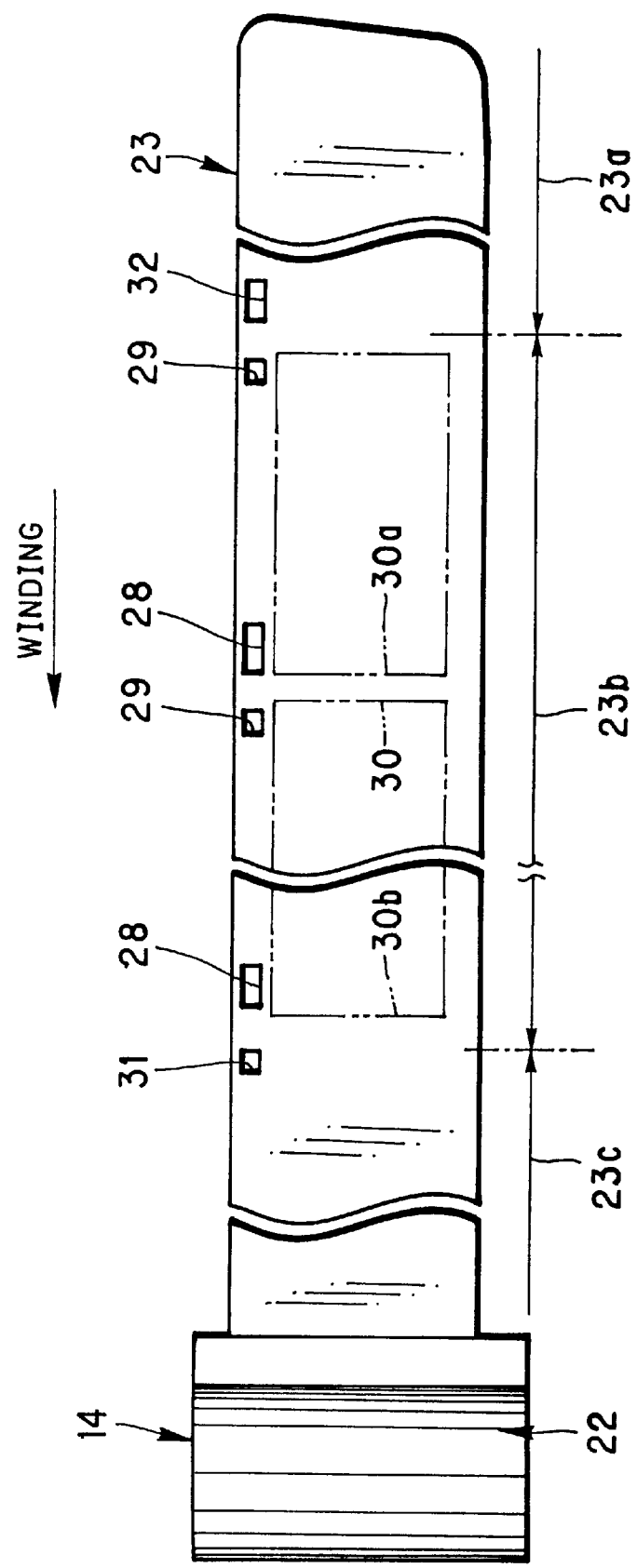
FIG. 3 is a plan illustrating a photo film with a photo film cassette.

In FIG. 3, the photo film 23 includes a leader 23a, an effective region 23b and a trailer 23c. In the effective region 23b, there are perforations 28 and 29 arranged along one lateral edge of the photo film 23. The great perforations 28 are relatively great. The small perforations 29 are smaller. The perforations 28 and 29 are arranged regularly in an alternate manner and at two intervals repeated alternately. Each of frames 30 is formed in a range of which beginning and ending positions are defined by one of the great perforations 28 and one of the small perforations 29. In the lens-fitted photo film unit 2, the photo film 23 is wound into the cassette shell 22 each time of taking an exposure. Consequently the beginning position of the one of the frames 30 is defined by one of the great perforations 28 as viewed in a direction of moving the photo film 23. The ending position of the one of the frames 30 is defined by one of the small perforations 29. The number of pairs of the perforations 28 and 29 is set equal to the number of the frames 30.

An end of the trailer 23c is retained on the spool 25. When the winder wheel 12 is operated to rotate the spool 25, the photo film 23 is wound about the spool 25. The leader 23a and the trailer 23c are regions not usable for exposures, but will be utilized in a developing step. All the photo film 23 including the leader 23a and the trailer 23c are wound into the cassette shell 22 when unexposed.

The photo film 23 is shaped by additionally working photo film adapted for use in an ordinary camera. The photo film 23 is distinct from the photo film for ordinary cameras for the reasons of the size of the great perforations 28 and existence of a small perforation 31 for initial charge. The small perforation 31 is added in a range of the trailer 23c. In the photo film for ordinary cameras, there are one-size perforations including the small perforations 29 and such as would be defined by shortening the great perforations 28. The same photo film has no perforation along the edge of the trailer 23c. In the photo film 23, a perforation 32 is formed in a range of the leader 23a for an initial operation of charging the shutter device when the camera is loaded with the photo film.

In the center of the photo film containing unit 16, a light-shielding tunnel 34 is formed. The light-shielding tunnel 34 operates to cover a photographic light path between the exposure unit 17 and the photo film 23. In the rear of the light-shielding tunnel 34 is formed an exposure aperture, which defines an exposure region to the photo film 23. The rear cover 20 has a photo film support face 20a which is curved and confronted with the exposure aperture. A photo film path has a curved shape defined between the photo film containing unit 16 and the photo film support face 20a. The photo film 23 passed through the photo film path is forcibly curved in contact with the photo film support face 20a. Therefore it is possible to compensate the curvature of the field of the taking lens 9 as a single lens element. An image of which points in its entire frame are well-focussed can be obtained.

In the front of the light-shielding tunnel 34, an opening 46 is formed to introduce a photographic object light from the taking lens 9 to an exposure aperture. In an upper position of the light-shielding tunnel 34, a wheel slot 34a is formed for causing a sprocket wheel in the exposure unit 17 to lie in contact with the photo film 23. There are a cassette containing chamber 36 and a roll containing chamber 37 between which the light-shielding tunnel 34 lies. The cassette containing chamber 36 pre-contains the cassette shell 22. The roll containing chamber 37 pre-contains a photo film roll 35 in which the photo film 23 is wound.

When the rear cover 20 is secured to the rear df the photo film containing unit 16, bottom lids 39 and 40 formed with the rear cover 20 are closed respectively to enclose the chambers 36 and 37 in a suitably light-tight manner. Note that the bottom lids 39 and 40 are connected to the rear cover 20 via flexible thinned portions. After using the lens-fitted photo film unit 2, the bottom lid 39 is opened to remove the photo film cassette 14.

On the top of the cassette containing chamber 36, the winder wheel 12 is mounted in a rotatable manner. A periphery of the winder wheel 12 has teeth regularly formed therewith. A drive shaft is formed on a bottom of the winder wheel 12, and is engaged with the spool 25 of the cassette shell 22. After each one exposure is taken, the winder wheel 12 is rotated in a counterclockwise direction in the drawing, to cause the spool 25 to wind the photo film 23. A preventive claw 45 on the top wall of the cassette containing chamber 36 is meshed with a gear of the winder wheel 12, and prevents the winder wheel 12 from rotating in a direction reverse to the winding direction.

It is to be noted that a cassette shutter closing mechanism (not shown) is mounted on a top and a side of the cassette containing chamber 36. When the photo film cassette 14 is removed from the cassette containing chamber 36, the shutter closing mechanism closes the cassette shutter rod 26 upon operation of opening the bottom lid 39.

The flash unit 18 is constituted by a printed circuit board 18a and the flash emitting window 11 secured to the printed circuit board 18a. The printed circuit board 18a includes a flash circuit. When the flash charge button 10 is depressed in the front cover 19, a switch segment 42 contacts a connecting point of the printed circuit board 18a to start storing charge for emitting flash. Upon a shutter releasing operation, the flash is emitted. The printed circuit board 18a also includes metal segments for connection with a dry battery 43, which is power source of the flash unit 18.

Figure 4:
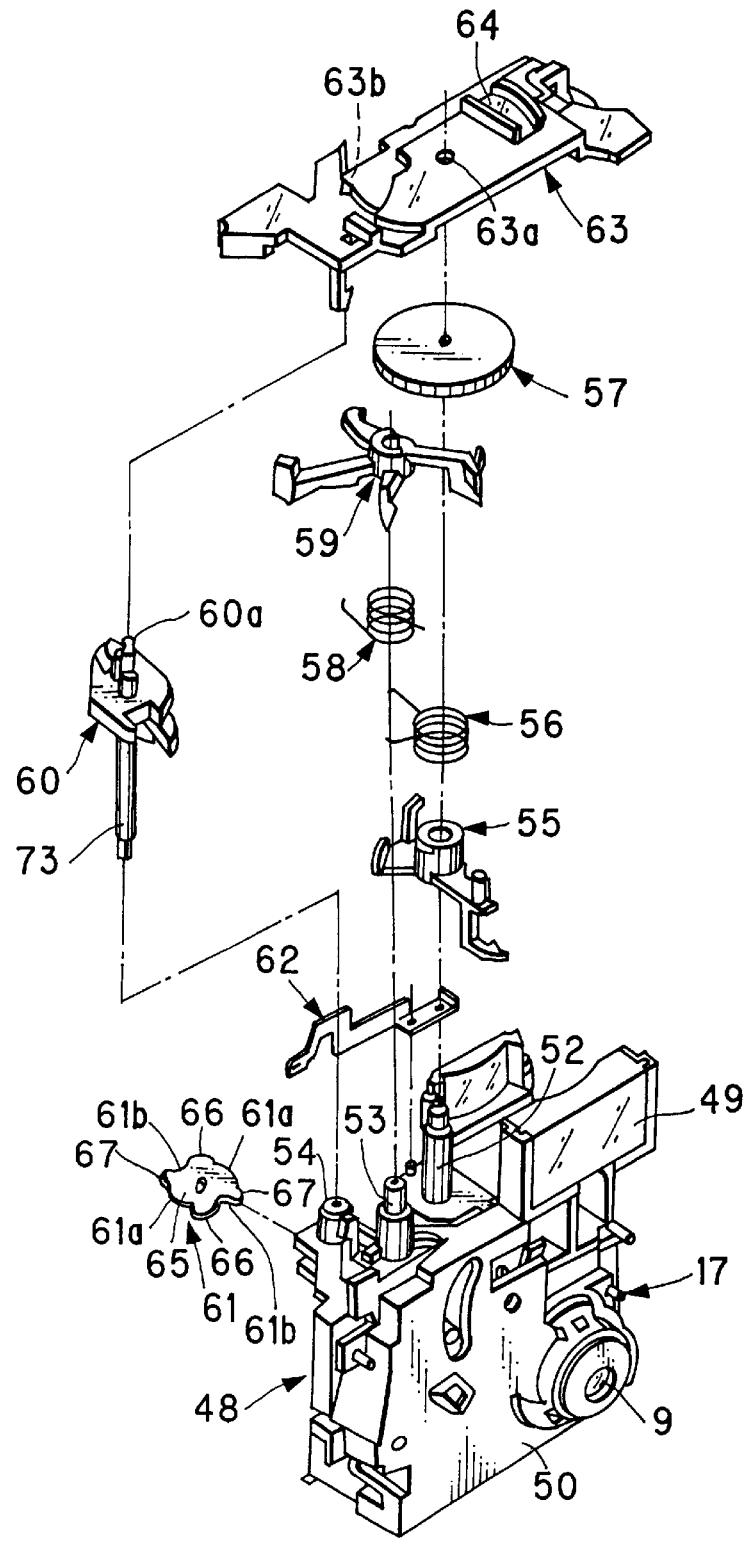
FIG. 4 is an exploded perspective illustrating an exposure unit.

In FIGS. 4, 5 and 6, the exposure unit 17 in relation to the present invention includes a base portion 48, which is a resinous part and to which various parts are secured by way of a single unit. The exposure unit 17 is secured to the front of the light-shielding tunnel 34 in a detachable manner. A combination of some of those parts is a shutter mechanism. Two lenses 49, combined as a finder lens, are supported on the top of the base portion 48 to constitute the viewfinder 8. A lens cover 50 is secured to the front of the base portion 48, and retains the taking lens 9. A shutter opening is formed between the lens cover 50 and the base portion 48 for passing the object light. A shutter blade is disposed at the shutter opening in a swingable manner to open/close the shutter opening.

On the top of the base portion 48, there are formed shafts 52 and 53 and a receiving portion 54. A shutter drive lever 55 of a shutter mechanism, a first coil spring 56 and a frame counter wheel 57 are axially supported on the shaft 52, in the order listed. A second coil spring 58 and a retainer lever 59 are axially supported on the shaft 53 in this order. A cam member 60 or rotating member is inserted in the receiving portion 54. All those parts in combination constitute the exposure unit 17 with a sprocket wheel 61, a spring 62 or bias mechanism and a top plate 63. The spring 62 is placed on the top of the base portion 48. The top plate 63 is secured to the top of the base portion 48. A hole 63a in the top plate 63 supports a top end of the shaft 52. In FIG. 7, the top plate 63 has a lower stepped portion 63b, which supports a top end 60a of the rotating member 60 in a rotatable manner. The lower stepped portion 63b also covers the top end 60a to prevent unwanted external dust, sand or the like from sticking the rotating member 60. The top plate 63 is formed from transparent resin, and includes a portion of a counter lens 64, which enlarges an images of the scale indicated on the top of the frame counter wheel 57.

The receiving portion 54 consists of a through hole communicating downwards. The bottom end of the rotating member 60 protrudes from a bottom end of the receiving portion 54. The bottom end of the rotating member 60 is engaged with the sprocket wheel 61, which is supported to appear through the wheel slot 34a in the light-shielding tunnel 34 toward the photo film 23. In FIGS. 8A–8D, the sprocket wheel 61 is constituted by a wheel portion 65 and two pairs of teeth 66 and 67 protruded therefrom. The small teeth 67 are relatively small. The great teeth 66 are greater. A combination of one of the great teeth 66 and one of the small teeth 67 is positioned in a rotationally symmetrical manner from a combination of another of the great teeth 66 and another of the small teeth 67. Each of the small teeth 67 is meshed with the one of the small perforations 29. Each of the great teeth 66 is meshed with the one of the great perforations 28.

Figure 8A:
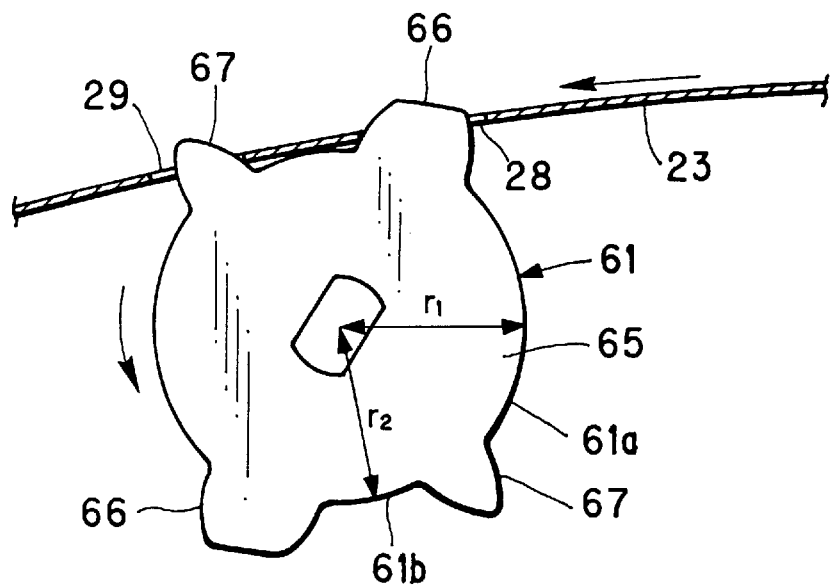
FIG. 8A is a plan illustrating a sprocket wheel of which two teeth are meshed respectively with a perforation.
Figure 8B:
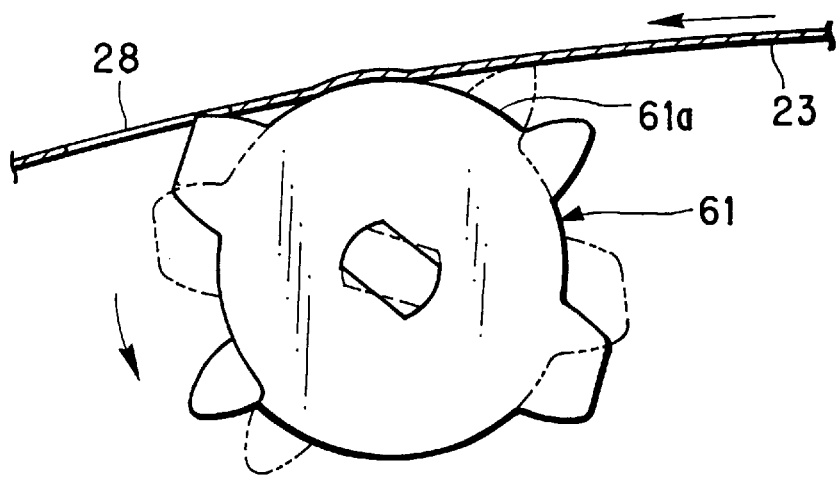
FIG. 8B is a plan illustrating the sprocket wheel of which a long arc-shaped face pushes the photo film.
Figure 8C:
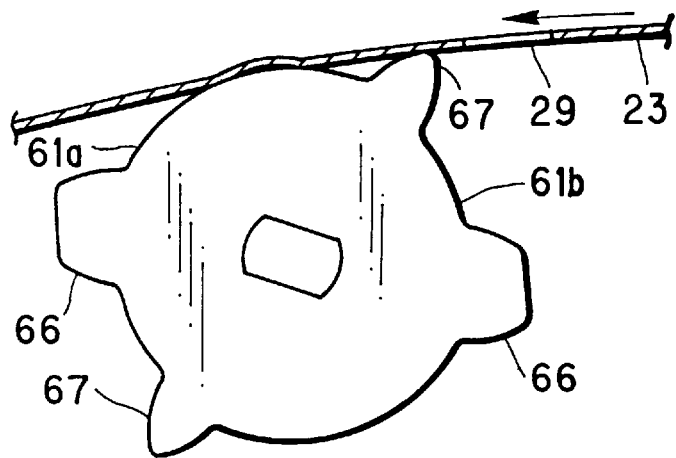
FIG. 8C is a plan illustrating the sprocket wheel of which a succeeding one of the teeth stands by for meshing.
Figure 8D:
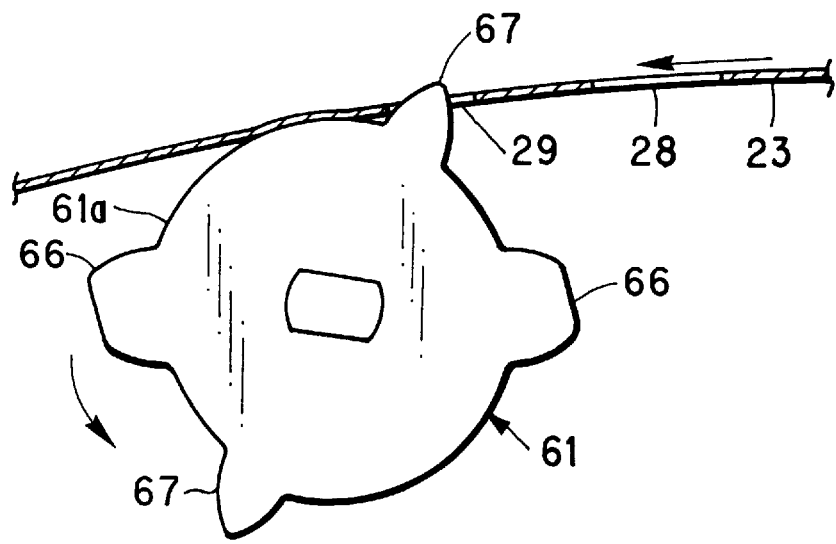
FIG. 8D is a plan illustrating the sprocket wheel of which the succeeding tooth is meshed with a perforation.

A relatively short arc-shaped face 61b is defined between the four teeth 66 and 67. A relatively long arc-shaped face 61a is defined between the two pairs of the teeth 66 and 67. The long arc-shaped face 61a has a radius r1. The short arc-shaped face 61b has a radius r2. Those radii satisfy a condition r1>r2. In other words, the long arc-shaped face 61a has a level radially protruded beyond a level of the short arc-shaped face 61b. In the course of movement of the photo film 23 by one frame toward the cassette shell 22, the one of the great teeth 66 in FIG. 8B is disengaged from the one of the great perforations 28 before the long arc-shaped face 61a is pressed against the photo film 23 with great force. The photo film 23 during this movement has a tendency of becoming flat due to tension to the photo film 23 even in contact with the photo film support face 20a being curved. Therefore the contact between the photo film 23 and the long arc-shaped face 61a becomes tighter, to heighten friction between them. The friction causes the sprocket wheel 61 to rotate in the counterclockwise direction until the one of the small teeth 67 comes in contact with the photo film 23 in FIG. 8C.

Figure 9:
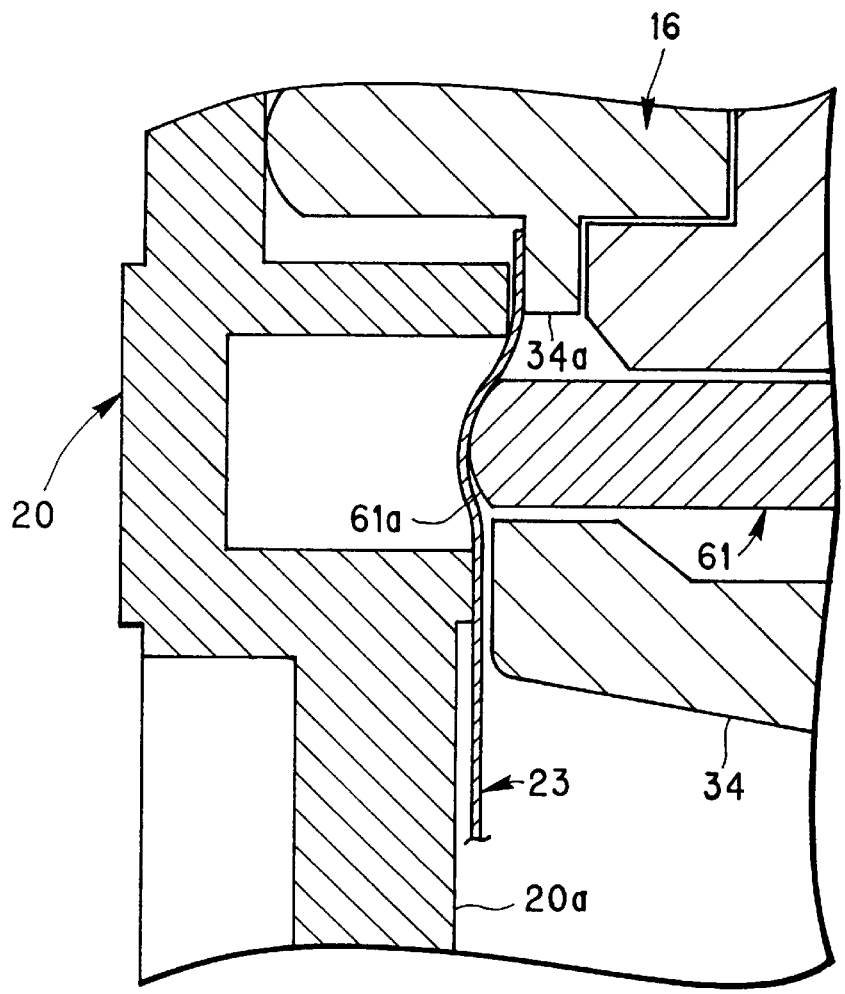
FIG. 9 is a cross section, partially broken, illustrating a relationship of the photo film, the sprocket wheel and a support face.

In FIG. 9, the long arc-shaped face 61a, as viewed in cross section, has an arcuate shape for the purpose of preventing sharp edges of the wheel portion 65 from fogging the photo film 23 by pressure and from creating "pressure marks". It is possible by changing the radius r1 of the long arc-shaped face 61a to change an interfering amount between the long arc-shaped face 61a and the photo film 23. The friction between them can be adjusted. The short arc-shaped face 61b does not protrude while the long arc-shaped face 61a protrudes. The short arc-shaped face 61b does not contact the photo film 23, so that a focussing plane of the photo film 23 is prevented from being influenced while one of the great teeth 66 is meshed with one of the great perforations 28. See FIG. 5.

The rotating member 60 consists of a combination of a counter drive shaft 69, a retainer cam 70, a charge cam 71, a driven projection 72 or bias cam and a shaft 73, in the downward order. The shaft 73 is inserted in the receiving portion 54. The sprocket wheel 61 is engaged with a bottom end of the shaft 73.

The driven projection 72 consists of a pair of projections arranged in a rotational symmetrical manner. In FIG. 8B, one of the great teeth 66 is disengaged from one of the great perforations 28. After this, the spring 62 mounted on the base portion 48 pushes the driven projection 72. The pushing force of the spring 62 is additional to the frictional force of the long arc-shaped face 61a to the photo film 23, and helps rotating the sprocket wheel 61 and the rotating member 60. The one of the small teeth 67 of the sprocket wheel 61 moves to a position of standby for mesh with a succeeding one of the small perforations 29. The spring 62 consists of a crooked thin plate of metal. Biasing force of the spring 62 is so small that resistance to operating the winder wheel 12 is not remarkably raised.

The shutter drive lever 55 is biased by the first coil spring 56 in the counterclockwise direction toward a released position. The first coil spring 56 has one first end 56a connected to a pin 48a of the base portion 48, and one second end 56b connected to a spring receiver 55a of the shutter drive lever 55. The charge cam 71 consists of a pair of wing-shaped projections arranged in a rotational symmetrical manner. The charge cam 71 pushes a knocker arm 55b of the shutter drive lever 55, to rotate the shutter drive lever 55 in the clockwise direction in FIG. 5 toward a charged position.

The second coil spring 58 has a first end 58a secured to a pin 48b of the base portion 48, and has a second end 58b secured to a spring receiver 59a. The retainer lever 59 is biased by the second coil spring 58 in the clockwise direction toward a retained position. When the rotating member 60 makes half a rotation to position a notch 70a of the retainer cam 70 for coincidence with a claw 59b of the retainer lever 59, then the retainer lever 59 is rotated by the second coil spring 58 in the clockwise direction in FIG. 5, to insert the claw 59b into the notch 70a. Then the rotating member 60 is stopped from rotating, for the photo film retention. It is noted that the first coil spring 56 is set to have biasing force higher than that of the second coil spring 58. The first and second coil springs 56 and 58, when assembled, are rotationally displaced for adjustment of the biasing force.

The retainer lever 59 is rotated clockwise to engage the claw 59b with the retainer cam 70. At the same time an engaging portion 74 on the bottom of the retainer lever 59 comes into a rotational path of an engageable portion 75 on the top of the shutter drive lever 55. The engaging portion 74 is engaged with the engageable portion 75, to retain the shutter drive lever 55 in the charged position.

When the retainer lever 59 is engaged with the retainer cam 70 and the shutter drive lever 55, a stop claw 59c is meshed with one of the teeth of the winder wheel 12. The photo film 23 is stopped from moving by rotationally retaining the winder wheel 12 as well as by retaining the rotating member 60. The sprocket wheel 61, in the course of charging the shutter, is stopped with one of the great teeth 66 meshed with one of the great perforations 28 in the photo film 23.

After the engagement of the engaging portion 74 and the engageable portion 75, the shutter release button 6 is depressed. A push rod 77 on a bottom of the shutter release button 6 in FIGS. 2 and 11 depresses the spring receiver 59a of the retainer lever 59, which is rotated in the counterclockwise direction against the bias of the second coil spring 58. Upon the rotation of the retainer lever 59, the engageable portion 75 is disengaged from the engaging portion 74. The bias of the first coil spring 56 causes the shutter drive lever 55 to rotate counterclockwise from the position of FIG. 5 to the position of FIG. 6.

When the shutter drive lever 55 is rotated in the counterclockwise direction, the knocker arm 55b formed under the engageable portion 75 knocks one end of the shutter blade. The shutter blade swings about its axis to open the shutter opening, to take an exposure to the photo film 23. The shutter blade is returned by the spring to close the shutter opening.

The contact of the engaging portion 74 with a side of the engageable portion 75 keeps the retainer lever 59 in a state rotated by the push rod 77 of the shutter release button 6. However the claw 59b is not disengaged from the retainer cam 70 only when the shutter release button 6 is depressed. This is for the purpose of preventing an unexposed portion of the photo film from being wound even upon a small push of the shutter release button 6, which would cause the winder wheel 12 to rotate.

A projection 79 is formed integrally with the retainer lever 59 and near to the engaging portion 74. When the shutter drive lever 55 is rotated counterclockwise during the release of the shutter, a knocker projection 80 is stricken on the projection 79. The knocker projection 80 is formed integrally with the shutter drive lever 55 and near to the engageable portion 75. As referred to above, the second coil spring 58 is set to have biasing force lower than that of the first coil spring 56. When the knocker projection 80 knocks the projection 79, the retainer lever 59 is rotated counterclockwise against the bias of the second coil spring 58. Then the claw 59b is moved out of the notch 70a of the retainer cam 70. The stop claw 59c is moved away from the winder wheel 12, to allow winding the photo film 23.

Figure 10:
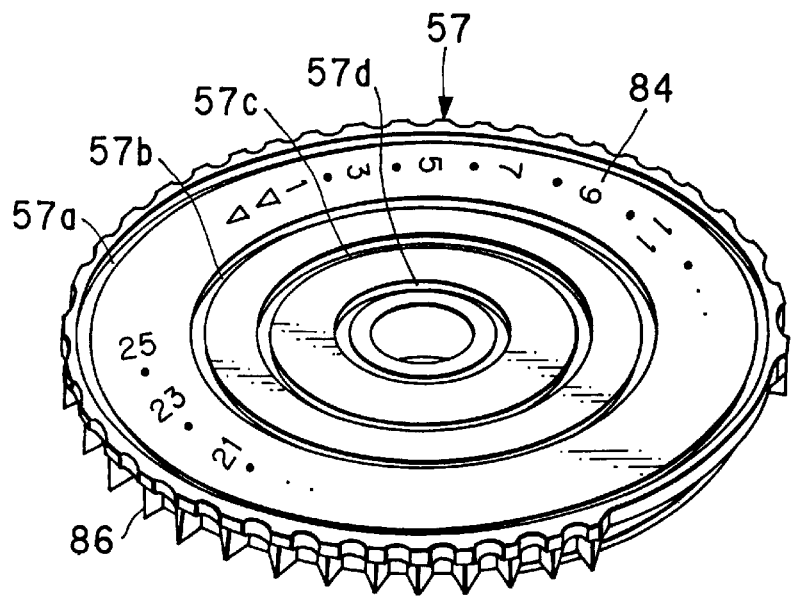
FIG. 10 is a perspective illustrating a frame counter wheel.

In FIG. 10, a top face of the frame counter wheel 57 has a scale 84 including numerals and points. The scale 84 is partially enlarged by the counter lens 64 of the top plate 63, and is observable through the counter window 7 of the housing 3. The scale 84 is constructed to indicate the number of remaining available frames of the photo film.

There are grooves 57a, 57b, 57c and 57d being concentrically arranged in a top face of the frame counter wheel 57 in positions different from the scale 84. This design helps to accommodate use of the lens-fitted photo film unit 2 in an environment with much minute dust, for example on the seashore with sand on a windy day. It is likely that dust enters the cover through the top opening or slit 6a of the shutter release button 6, and remains between the spring 62 and the rotating member 60 to reduce the biasing force of the spring 62 to the rotating member 60. The grooves 57a–57d act to overcome this failure. If dust enters the cover, the grooves 57a–57d collect or capture the dust, and prevent the dust from dropping down to the rotating member 60 about the frame counter wheel 57.

A stepper gear 86 is formed on the periphery of the frame counter wheel 57 to rotate the frame counter wheel 57 by one step. The stepper gear 86 is meshed with a stepper cam 88 formed under the counter drive shaft 69. The stepper cam 88 consists of a pair of wing-shaped projections arranged in a rotational symmetrical manner. See FIG. 5. When the rotating member 60 makes half a rotation, the stepper gear 86 is rotated by one tooth in the clockwise direction.

Reference numeral 94 designates a disabling projection. When all frames of a predetermined number are exposed, the disabling projection 94 comes in contact with a lower projection (not shown) on a bottom of the frame counter wheel 57, to block further rotation of the frame counter wheel 57. This is for the purpose of keep the long arc-shaped face 61a confronted with the photo film 23 to allow winding all the photo film 23 after finishing taking exposures.

Figure 11:
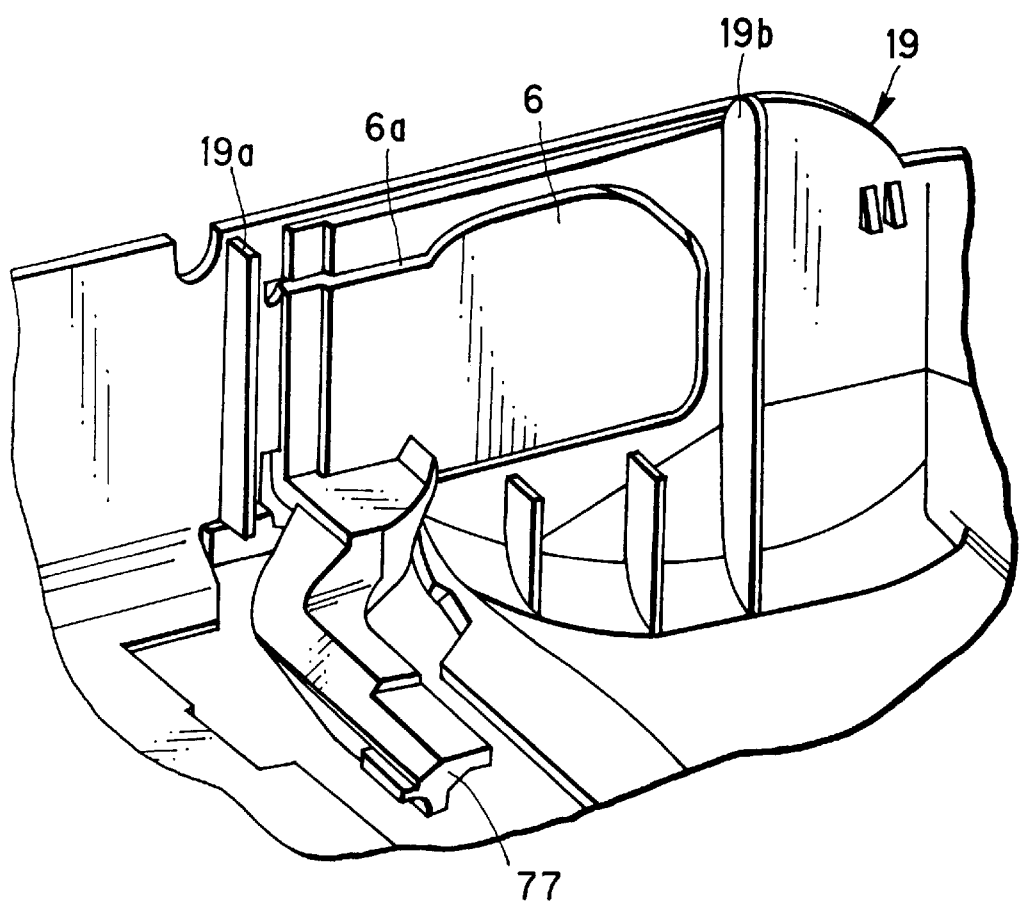
FIG. 11 is a rear perspective illustrating a shutter button portion and ridges on the inside of a front cover.

In FIG. 11, ridges 19a and 19b are formed on the inside of a top wall of the front cover 19, for the purpose of protecting the exposure unit 17 from dust. If dust enters the periphery of the shutter release button 6, the ridge 19a effectively prevents the dust from spreading to the exposure unit 17.

The operation of the lens-fitted photo film unit 2 is described now. The periphery of the shutter release button 6 is covered by the tongue 4a of the outer sheet member 4, so that dust, sand or the like is blocked and does not enter the housing 3 through the periphery of the shutter release button 6. A user, after purchasing the lens-fitted photo film unit 2, initially rotates the winder wheel 12 to stand by for taking an exposure. When the winder wheel 12 is rotated, the spool 25 of the cassette shell 22 in FIG. 2 is rotated in the winding direction. The trailer 23c in FIG. 3 is wound into the cassette shell 22.

When the photo film 23 starts being moved by the winding operation, the photo film 23 is pulled with tension inside the photo film path and tends to flatten. A surface of the photo film 23 is tightly pressed against the long arc-shaped face 61a of the sprocket wheel 61. See FIG. 8B. There occurs high friction between the photo film 23 and the long arc-shaped face 61a. The sprocket wheel 61 and the rotating member 60 are rotated reliably in the winding direction by combination of the friction and the bias of the spring 62. One of the small teeth 67 comes to the standby position for being meshed with the small perforation 31. See FIG. 8C. The spring 62 has the biasing force small and sufficient for helping rotating the sprocket wheel 61. The winder wheel 12 can be rotated manually with small manual force.

When the photo film 23 is further moved, the one of the small teeth 67 of the sprocket wheel 61 comes in mesh with the small perforation 31. See FIG. 8D. Then the one of the 74 great teeth 66 comes in mesh with one of the great perforations 28 associated with an initial frame 30b. During a period which begins upon starting rotating the winder wheel 12 and ends when the one of the great teeth 66 is meshed with the one of the great perforations 28, the rotating member 60 is caused to make half a rotation in the counterclockwise direction.

While the rotating member 60 makes half a rotation, the charge cam 71 pushes the knocker arm 55b of the shutter drive lever 55, to rotate the shutter drive lever 55 in the clockwise direction against the first coil spring 56. After rotating the shutter drive lever 55 to the charged position, the retainer lever 59 is released from pressure of the knocker projection 80 of the shutter drive lever 55. The retainer lever 59 is rotated clockwise by the bias of the second coil spring 58.

When the retainer lever 59 is rotated in the clockwise direction, the claw 59b is engaged with the notch 70a of the retainer cam 70 to block rotation of the rotating member 60. The engaging portion 74 is caused to enter a moving path of the engageable portion 75 of the shutter drive lever 55. The shutter drive lever 55, released from being pressed by the charge cam 71, is caused by the first coil spring 56 to rotate in the counterclockwise direction. So the engageable portion 75 is engaged with the engaging portion 74.

Then the stop claw 59c of the retainer lever 59 is meshed with one of the teeth of the winder wheel 12, to block rotation of the winder wheel 12. The frame counter wheel 57 is rotated in the clockwise direction by the stepper gear 86 and the stepper cam 88. A numeral 25 included in the scale 84, as the number of available frames, becomes visible through the counter window 7. Thus the lens-fitted photo film unit 2 stands by for taking an exposure.

Then a range to be photographed is visually checked through the viewfinder 8. The shutter release button 6 is depressed. Although there occurs a gap between the outer opening 13 of the tongue 4a and the shutter release button 6, it is unlikely that dust, sand or the like enters the outer opening 13, because the user's finger on the shutter release button 6 covers and closes the outer opening 13. If dust, sand or the like should enter the top opening 6a or slit, the rotating member 60 is safely rotatable, because the top end of the rotating member 60 is covered by the lower stepped portion 63b of the top plate 63. The dust, sand or the like, if placed on the top of the frame counter wheel 57, is captured by the grooves 57a–57d in a collective manner, and does not drop away from the periphery of the frame counter wheel 57 down toward the rotating member 60. There is no likeliness of entry of the dust between the rotating member 60 and the spring 62.

When the shutter release button 6 is depressed, the push rod 77 pushes the spring receiver 59a of the retainer lever 59 to rotate it in the counterclockwise direction toward the unretained position. Thus the engaging portion 74 of the retainer lever 59 is disengaged from the engageable portion 75 of the shutter drive lever 55. In FIG. 6, the shutter drive lever 55 is rotated counterclockwise by the first coil spring 56.

The knocker arm 55b of the shutter drive lever 55 knocks and swings a distal end of the shutter blade supported in a swingable manner between the base portion 48 and the lens cover 50. Then the shutter opening is opened to expose a frame on the photo film 23. The shutter blade is abruptly closed by the bias of a spring to close the shutter opening.

On the shutter drive lever 55 knocking the shutter blade, the knocker projection 80 knocks the projection 79 of the retainer lever 59. Since the biasing force of the second coil spring 58 is smaller than that of the first coil spring 56, the retainer lever 59 is rotated in the counterclockwise direction. The claw 59b is moved out of the notch 70a in the retainer cam 70, to release the photo film 23 from retention. Then the winder wheel 12 is rotated in the winding direction being counterclockwise. The rotating member 60 makes half a rotation. The shutter device is charged, the frame counter wheel 57 is rotated by one step, and the photo film 23 is retained.

Similarly exposures are taken. The photo film is wound by one frame after each exposure. After a final frame 30a is exposed, all the remaining portion of the photo film 23 is wound into the cassette shell 22, inclusive of the final frame 30a and the leader 23a. The lens-fitted photo film unit 2 after being used for the exposures is forwarded by the user to a photofinishing agent for photofinishing operation in a photo laboratory. In the photo laboratory, the photo film cassette 14 is removed from the lens-fitted photo film unit 2. The photo film 23 is subjected to development and printing. Photographic prints are provided for the user, to whom the photo film 23 being developed is returned.

Figure 12:
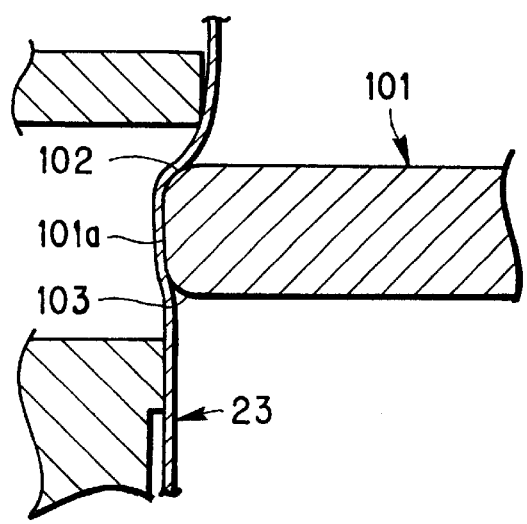
FIG. 12 is an explanatory view in cross section, illustrating a relationship of the photo film and another preferred sprocket wheel.
Figure 13:
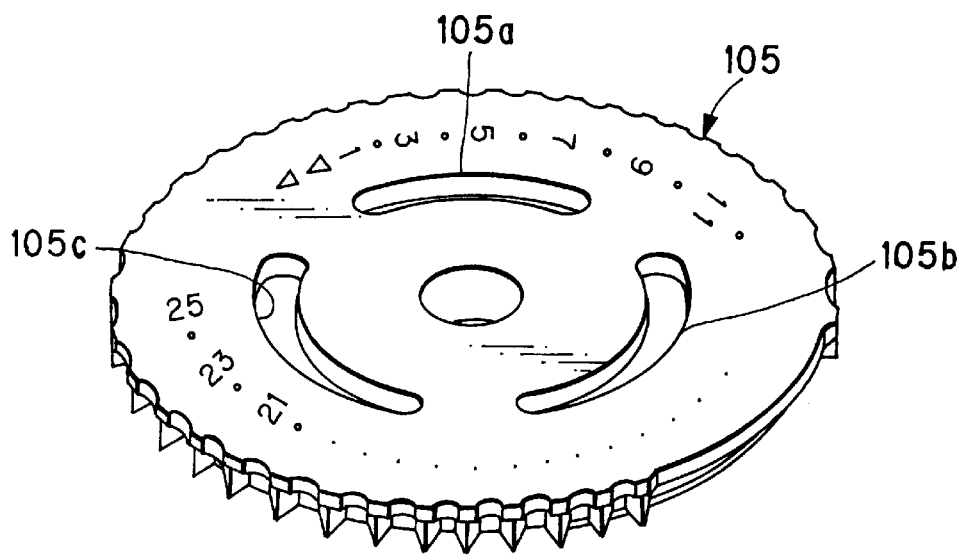
FIG. 13 is a perspective illustrating another preferred frame counter wheel.

In the above embodiment, the long arc-shaped face 61a, as viewed in cross section, has the arcuate shape of FIG. 9. Alternatively only edges 102 and 103 of a long arc-shaped face 101a of a sprocket wheel 101 can be rounded off, as illustrated in FIG. 12. Namely the long arc-shaped face 101a, as viewed in cross section, may have the edges 102 and 103 being rounded and a short straight line between the edges 102 and 103. In the above embodiment, the frame counter wheel 57 has the grooves 57a–57d of FIG. 10. Alternatively a frame counter wheel 105 can have through slits 105a, 105b and 105c in arc shapes, as illustrated in FIG. 13. The dust placed on the frame counter wheel 105 falls directly under the frame counter wheel 105 through the through slits 105a–105c, and is prevented from entry between the rotating member 60 and the spring 62.

In the above embodiment, the long arc-shaped face 61a of the sprocket wheel 61 in contact with the photo film 23 is arc-shaped and has the radius r1. Alternatively the long arc-shaped face 61a may be shaped parabolically or in other protruded forms to push the photo film 23. In the above embodiment, the sprocket wheel has two pairs of teeth. Alternatively a sprocket wheel may have only one pair of teeth, and may make one rotation while the photo film is moved by one frame. A sprocket wheel may have three or N pairs of teeth, and may make one third rotation or 1/N rotation while the photo film is moved by one frame. The long arc-shaped face 61a of any form of sprocket wheel should be protruded to push the photo film 23 to deform it. In the above embodiment, the spring 62 or bias mechanism is used. Of course the spring 62 may be eliminated if the frictional force between the long arc-shaped face 61a and the photo film 23 is suitable. In the above embodiment, the novel sprocket wheel is incorporated in the lens-fitted photo film unit. Of course the sprocket wheel can be incorporated in a compact camera of a low-cost type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film, said photo film including a plurality of perforation groups arranged in a longitudinal direction thereof and cyclically at a predetermined pitch, each of said perforation groups including first and second perforations arranged at a predetermined distance, said lens-fitted photo film unit including a winder wheel, a sprocket wheel and a shutter device, said winder wheel being adapted to winding said photo film per one frame by said predetermined pitch of said perforation groups, said sprocket wheel being meshed with said perforations, and rotated by a predetermined amount while said photo film is wound per said one frame, and said shutter device being charged in response thereto, an improvement of said lens-fitted photo film unit comprising:

said sprocket wheel including a wheel portion structured and arranged to rotate about a rotational axis, at least one pair of teeth including first and second teeth arranged on a periphery of said wheel portion, said first tooth being meshed with said first perforation, and then said second tooth being meshed with said second perforation, a remainder of the periphery of the wheel portion consisting of arc-shaped faces, including at least first and second said arc-shaped faces arranged between adjacent said first and second teeth, a length of said first arc-shaped face being determined in association with said predetermined distance, all of said second arc-shaped face being more distant from the rotational axis than is said first arc-shaped face, to push said photo film, wherein said wheel portion, after said second tooth is moved away from said second perforation, is rotated by said photo film with friction between said second arc-shaped face and said photo film.

2. The lens-fitted photo film unit of claim 1, wherein all of said second arc-shaped face is more distant from the rotational axis than is all of said first arc-shaped face.

3. A lens-fitted photo film unit as defined in claim 2, further comprising:

a main body for containing said photo film, having a curved rear surface in which an exposure aperture is formed, said photo film being moved in contact with said rear surface, there being a slot formed in said rear surface and outside said exposure aperture, through which said sprocket wheel is adapted to rotate; and a rear cover, disposed behind said main body, there being a curved photo film path defined between said rear cover and said main body, wherein said second arc-shaped face protrudes rearwards beyond said rear surface of said main body when rotationally positioned rearwards.

4. A lens-fitted photo film unit as defined in claim 3, wherein said main body has first and second portions respectively defined on a bottom and a top of said slot;

said rear cover having a third portion confronted with said first portion and a fourth portion confronted with said second portion, said fourth portion being positioned forward of said third portion to push forward an edge portion of said photo film above said perforation groups.

5. A lens-fitted photo film unit as defined in claim 2, further comprising a top cover for covering a top of said winder wheel, said top cover including:
a flap-shaped shutter button portion defined by a slit formed in said top cover, for actuating said shutter device when depressed downwards; and
at least one ridge, formed to project from a lower surface of said top cover, extending horizontally beside said shutter button portion, for preventing dust from spreading if said dust has entered said slit.

6. A lens-fitted photo film unit as defined in claim 5, further comprising:
an outer sheet member for covering said top cover at least partially; and
an opening formed in said outer sheet member, for allowing access to a portion of said shutter button portion.

7. A sprocket wheel designed to be used in a camera, said sprocket wheel comprising:
a wheel portion structured and arranged to rotate about a rotational axis;
at least one pair of teeth including first and second teeth disposed on a periphery of said wheel portion, said first and second teeth being designed to engage, respectively, first and second perforations of a photo film, said photo film including a plurality of perforation groups arranged at a predetermined pitch in a longitudinal direction thereof, each of said perforation groups including said first and second perforations, said first and second perforations within each of said perforation groups being separated from one another by a predetermined distance; and
a remainder of the periphery of the wheel portion consisting of arc-shaped faces including at least first and second said arc-shaped faces arranged between adjacent said first and second teeth, a length of said first arc-shaped face being determined in association with said predetermined distance, all of said second arc-shaped face being more distant from the rotational axis than is said first arc-shaped face;
wherein said sprocket wheel is designed to be disposed adjacent to said photo film, said sprocket wheel being designed to be rotatable by advancement of said photo film due to contact between said photo film and said teeth under a condition that said teeth are engaged with said perforations, said sprocket wheel being designed to be rotatable by advancement of said photo film under a condition that said teeth are not engaged with said perforations due to friction between said second arc-shaped face and said photo film.

8. The sprocket wheel of claim 7, wherein all of said second arc-shaped face is more distant from the rotational axis than is all of said first arc-shaped face.

9. A sprocket wheel as defined in claim 1, wherein said first and second arc-shaped faces are integrally formed with said wheel portion.

10. A sprocket wheel as defined in claim 9, wherein said first arc-shaped face is defined by an arc having a first radius, said second arc-shaped face is defined by an arc having a second radius, and said second radius is greater than said first radius.

11. A sprocket wheel as defined in claim 10, wherein said at least one pair of teeth comprises first and second pairs of teeth, said first pair of teeth including said first and second teeth, said second pair of teeth including third and fourth teeth, said third tooth being rotationally symmetrical with said first tooth, and said fourth tooth being rotationally symmetrical with said second tooth; and
there being third and fourth arc-shaped faces defined by said third and fourth teeth on said periphery of said wheel portion, said third arc-shaped face being rotationally symmetrical with said first arc-shaped face, and said fourth arc-shaped face being rotationally symmetrical with said second arc-shaped face.

12. A sprocket wheel as defined in claim 11, wherein said second arc-shaped face is curved as viewed in an axial cross section of said wheel portion.

13. A sprocket wheel as defined in claim 19, wherein said second arc-shaped face, as viewed in an axial cross section of said wheel portion, comprises a center straight section between upper and lower rounded sections.

14. A sprocket wheel as defined in claim 10, wherein said second perforation is greater than said first perforation, and second tooth is greater than said first tooth.

15. A photo film winding device for winding photo film, comprising:
a winder wheel adapted to wind a photo film by one frame, said photo film including a plurality of perforation groups arranged at a predetermined pitch in a longitudinal direction thereof, each of said perforation groups including first and second perforations arranged at a predetermined distance; and
a sprocket wheel designed to mesh with said perforations and be rotated a predetermined amount while said photo film is wound by said one frame, a shutter device being charged in response thereto, said sprocket wheel comprising:
a wheel portion structured and arranged to rotate about a rotational axis;
at least one pair of teeth including first and second teeth arranged on a periphery of said wheel portion, said first tooth being designed to engage said first perforation, said second tooth being designed to engage said second perforation; and
a remainder of the periphery of the wheel portion consisting of arc-shaped faces including at least first and second said arc-shaped faces arranged between adjacent said first and second teeth, a length of said first arc-shaped face being determined in association with said predetermined distance, all said second arc-shaped face being more distant from the rotational axis than is said first arc-shaped face;
wherein said sprocket wheel is designed to be disposed adjacent to said photo film, said sprocket wheel being designed to be rotatable by advancement of said photo film due to contact between said photo film and said teeth under a condition that said teeth are engaged with said perforations, said sprocket wheel being designed to be rotatable by advancement of said photo film under a condition that said teeth are not engaged with said perforations due to friction between said second arc-shaped face and said photo film.

16. The photo film winding device of claim 15, wherein all of said second arc-shaped face is more distant from the rotational axis than is all of said first arc-shaped face.

17. A photo film winding device as defined in claim 1, wherein said first and second arc-shaped faces are integrally formed with said wheel portion.

18. A photo film winding device as defined in claim 17, wherein said at least one pair of teeth comprises first and second pairs of teeth, said first pair of teeth including said first and second teeth, said second pair of teeth including third and fourth teeth, said third tooth being rotationally symmetrical with said first tooth, and said fourth tooth being rotationally symmetrical with said second tooth; and there being third and fourth arc-shaped faces defined by said third and fourth teeth on said periphery of said wheel portion, said third arc-shaped face being rotationally symmetrical with said first arc-shaped face, and said fourth arc-shaped face being rotationally symmetrical with said second arc-shaped face.

19. A photo film winding device as defined in claim 17, wherein said first arc-shaped face is defined by an arc having a first radius, said second arc-shaped face is defined by an arc having a second radius, and said second radius is greater than said first radius.

20. A photo film winding device as defined in claim 19, wherein said second arc-shaped face is curved as viewed in an axial cross section of said wheel portion.

21. A photo film winding device as defined in claim 19, wherein said second arc-shaped face, as viewed in an axial cross section of said wheel portion, comprises a center straight section between upper and lower rounded sections.

22. A photo film winding device as defined in claim 16, further comprising a bias mechanism for rotationally biasing said sprocket wheel while said second arc-shaped face is capable of pressing against said photo film.

23. A photo film winding device as defined in claim 16, further comprising:

a rotating member, rotatable in a manner integral with said sprocket wheel by said predetermined amount, for charging said shutter device; and a retainer mechanism, engaged with said rotating member when said rotating member is rotated by said predetermined amount, for locking said sprocket wheel, said retainer mechanism being disengaged from said rotating member upon a release of said shutter device, to allow said sprocket wheel to rotate.

24. A photo film winding device as defined in claim 23, wherein said retainer mechanism, when said second tooth is meshed with said second perforation, is engaged with said rotating member to lock said sprocket wheel.

25. A photo film winding device as defined in claim 24, wherein said sprocket wheel, after being unlocked, may be rotated by movement of said photo film such that said second tooth is moved away from said second perforation, thereupon said sprocket wheel may be rotated by said photo film further by said predetermined amount to cause said first tooth to contact said photo film, said first tooth standing by to allow engagement with another of said perforation groups, and said photo film being movable while in contact with said first tooth while said first tooth stands by.

26. A photo film winding device as defined in claim 24, further comprising a frame counter wheel, rotationally stepped when said rotating member rotates by said predetermined amount, to display indication related to a number of frames exposed on said photo film.

27. A photo film winding device as defined in claim 26, wherein said frame counter wheel includes at least one groove formed on a top face thereof for collecting minute dust placed on said top face.

28. A photo film winding device as defined in claim 27, wherein said at least one groove comprises concentrically arranged plural grooves.

29. A photo film winding device as defined in claim 26, wherein said frame counter wheel includes at least one through slit for causing minute dust to drop therethrough from a top face thereon.

30. A photo film winding device as defined in claim 29, wherein said at least one slit comprises plural slits being arc-shaped.

31. A photo film winding device as defined in claim 24, wherein said at least one pair of teeth comprises first and second pairs of teeth, said first pair of teeth including said first and second teeth, said second pair of teeth including third and fourth teeth, said third tooth being rotationally symmetrical with said first tooth, and said fourth tooth being rotationally symmetrical with said second tooth; and there being third and fourth arc-shaped faces defined by said third and fourth teeth on said periphery of said wheel portion, said third arc-shaped face being rotationally symmetrical with said first arc-shaped face, and said fourth arc-shaped face being rotationally symmetrical with said second arc-shaped face.

32. A photo film winding device as defined in claim 31, further comprising:

a driven projection formed to radially project from said rotating member; and a bias mechanism, disposed to extend into a rotational path of said driven projection, said driven projection being pushed by said bias mechanism to rotate upon said sprocket wheel being positioned to allow disengagement of said second tooth of said first pair of teeth, said sprocket wheel being rotated before said third tooth of said second pair of teeth is positioned to allow engagement with said first perforation of another of said perforation groups.

* * * * *